United States Patent [19]
Luik

[11] Patent Number: 6,019,013
[45] Date of Patent: Feb. 1, 2000

[54] MACHINE TOOL OPERATED BY GYROSCOPIC PRECESSION

[76] Inventor: Ilmar Luik, 169 Bolling Rd., Meridianville, Ala. 35759

[21] Appl. No.: 09/185,382

[22] Filed: Nov. 3, 1998

Related U.S. Application Data

[63] Continuation-in-part of application No. 08/909,699, Aug. 12, 1997, which is a continuation-in-part of application No. 08/328,148, Oct. 24, 1994, Pat. No. 5,655,412.

[51] Int. Cl.$^7$ .............................. G05G 11/00; G01C 19/02
[52] U.S. Cl. ..................................... 74/490.01; 74/490.03; 74/5.34
[58] Field of Search ........................... 74/490.01, 490.03, 74/5.34, 5.37, 5.22, 5.46, 5.69, 5.2, 5.9, 845; 414/735, 744; 318/649; 409/131, 218, 201, 216, 199; 408/127, 6

[56] References Cited

U.S. PATENT DOCUMENTS

| | | | |
|---|---|---|---|
| 5,157,823 | 10/1992 | Delaval et al. ..................... 414/743 X |
| 5,201,617 | 4/1993 | Delaval et al. ......................... 409/131 |
| 5,401,124 | 3/1995 | Hettich ....................................... 408/6 |
| 5,522,275 | 6/1996 | Mauletti .............................. 74/409.03 |
| 5,584,621 | 12/1996 | Bertsche et al. ...................... 409/201 |

Primary Examiner—Thomas R. Hannon
Assistant Examiner—Marcus Charles
Attorney, Agent, or Firm—Mark Clodfelter

[57] ABSTRACT

A machine tool operated by gyroscopic precession is disclosed. The machine tool is provided with a rotatable member disposed for rotation in a single plane, the member mounted to a base. A gyroscopic mass supported by a gimbal is mounted to the rotatable member so that the spin axis of the gyroscopic mass, in a null position, is parallel to a plane of rotation of the rotatable member. A sensor is provided for sensing position of the rotatable member, the sensor providing a control input to a computer, which in turn develops a drive signal for driving an actuator coupled to the gimbal. When the actuator is activated by the drive signal, the gimbal is displaced, precessing the gyroscopic mass and generating a force used to rotate the rotatable member.

18 Claims, 6 Drawing Sheets

MACHINE TOOL OPERATED BY GYROSCOPIC PRECESSION

CONTINUING APPLICATION DATA

This application is a continuation-in-part of patent application Ser. No. 08/909,699, filed Aug. 12, 1997, which is a continuation-in-part of patent application Ser. No. 08/328,148, filed Oct. 24, 1994, now U.S. Pat. No. 5,655,412, which is incorporated herein in its entirety by reference.

FIELD OF THE INVENTION

This invention relates to Computer Numeric Controlled (CNC) machine tools, rotary index tables, swinging arm robots, and other machines having heavy rotatable members that are accelerated and decelerated during operation, and particularly to such machines wherein precession of a relatively large gyroscopic mass is used to power such rotational movements.

BACKGROUND OF THE INVENTION

Machine tools having large rotary members, such as swinging arm robots, are constructed so as to attenuate or reduce detrimental effects of reaction forces generated when the rotary members are moved. Typically, a servo motor or the like is mounted to a base of the machine, with the rotary member moved by the motor or via a gear or pulley arrangement. When the rotary member is moved, reaction forces of the motor are absorbed into the heavy, well dampened mass of the base, which is generally of rigid cast iron or polymer machine construction and may be further secured to a concrete floor or other heavy foundation to further dampen these reaction forces.

While generally effective, the mass needed to provide dampening for these reaction forces is expensive, as is the structure needed to support the mass of the machines. Further, machine accuracy is limited by the mass of the machine base and its rigidity due to the fact that reaction forces are attenuated and not eliminated. Further yet, with increasing machining speeds, flexure of the base occurs when heavy loads are applied thereto by the motor, in turn causing machine accuracy to deteriorate proportionally.

The principles governing behavior of rotating bodies, hereinafter denoted as gyroscopic masses, are well understood, and have been used for many years in many forms as sensor elements to provide stabilizing signals for control of various vehicular contrivances, particularly aircraft. In other applications, relatively large gyroscopic masses, known as Control Moment Gyroscopes, (CMG) have been developed and mounted in spacecraft and used to maintain a fixed attitude of the spacecraft through the use of gyroscopic forces. From the 1970s through the present, HONEYWELL CORP (TM) of Phoenix, Ariz. has been a major source of CMG technology as well as reaction wheel systems for satellite attitude control. During this time, extensive efforts have been made to refine performance capabilities and reliability of CMG technology. Among these endeavors was the successful development of a magnetically suspended reaction wheel for the Annular Momentum Control Device.

While the use of gyroscopic masses for stabilization purposes is well known, Applicant is unaware of any effort to use a gyroscopic mass to affect rotary movement of machine tools. Here, advantages are believed to be numerous, and include elimination of flexure of the mount of a machine tool by powering a rotary member mounted thereto without the power source being coupled to the mount. As such, the mount does not receive any reaction forces from the power source during rotation of the rotary member, but serves merely as a pivot for rotation. As a result, the base and supporting structure for the rotating member may be constructed using less weight and less attendant costs. Also, machining accuracy should increase due to greater closed loop positional control of the rotating member. Further, it is believed that undesirable vibrations that typically cause "chatter" during a machining operation are dampened or otherwise reduced by the gyroscopic mass.

A primary feature of the invention is the fact that ability to produce torque on a rotating member using a gyroscopic mass is dependent on two variables, namely rate of gimbal movement and momentum of the gyroscopic mass. For larger momentum values, small gimbal rates produce significant precession torques, which may be used to move the rotating member through large excursions or apply greater force to a metalworking tool during a metalworking operation. These small gimbal rates may be achieved using linear actuators such as solenoids, hydraulic cylinders or by rotary motors. Another advantage is that since the rotating member typically rotates in a horizontal plane, and the linear actuators produces gimbal motion against the rotating member in a vertical plane, no cross-coupling of these forces occurs. As a result, reaction forces of the linear actuators against the rotating member do not act as a disturbance input in the control arm scheme. Yet another advantage of the present invention is that the gyroscopic mass, when undisturbed, maintains a fixed orientation of the rotatable member without applying reaction forces to the mount or base of the machine. This is superior to conventional servo systems, which when held stationary apply reaction forces to the base, causing a loss of machining accuracy.

In the parent application to this case, now U.S. Pat. No. 5,655,412, a system was described wherein a pair of counterrotating gyroscopes are used to move a rotary arm of a machine tool. However, the use of two gyroscopes is believed to be unnecessary as a single CMG-type gyroscope should provide sufficient precession torque to move a rotary arm.

Accordingly, it is a broad object of the invention to use a single gyroscope to rotate a member in a single plane with little or no reaction forces being coupled to the support for the rotating member. It is another object of the invention to provide machine tools, such as a swinging arm robot, wherein precession of a single gyroscopic mass is used to provide rotational energy so that little or no reaction forces from such rotation are generated, increasing accuracy and efficiency of machining operations. It is yet another object of the invention to provide a machine tool as described wherein a rotatable member is accelerated and decelerated by precession of a gyroscopic mass, and driven at a constant velocity by a servo mechanism. Other objects and improvements will become apparent upon a reading of the following appended specification.

SUMMARY OF THE INVENTION

A machine tool is disclosed wherein a movable member rotates in a single plane, the member provided with means for working material of a workpiece. A gimbal having a gimbal rotational axis supports a gyroscopic mass so that a spin axis of the gyroscopic mass is oriented 90 degrees to the gimbal rotational axis, with the gimbal mounted to the movable member so that the gimbal rotational axis is parallel with a plane of rotation of the movable member. An actuator responsive to a control signal is mounted so as to apply rotational force to the gimbal, displacing the gimbal and causing the gyroscope to precess. This precession then causes movement of the movable member.

DETAILED DESCRIPTION OF THE DRAWINGS

Figure 1:
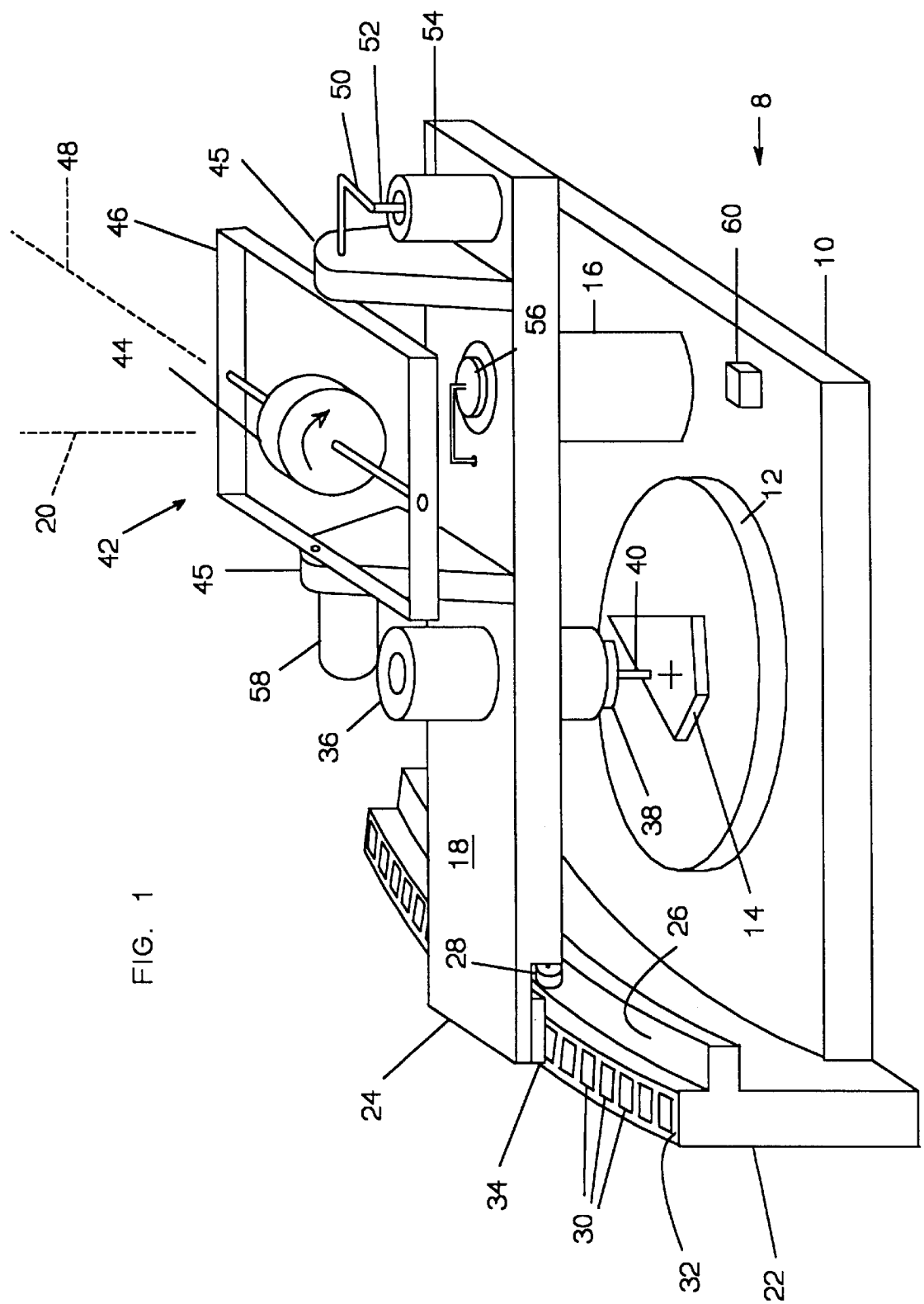
FIG. 1 is a diagrammatic view of one embodiment of the instant invention.

Referring initially to FIG. 1, a machine tool 8 as contemplated by the present invention is shown. Here, a base 10 supports a rotatable table 12 to which a workpiece 14 is mounted. A vertically oriented pedestal or similar support 16 for rotably supporting arm 18 is mounted to base 10, with arm 18 mounted by means of antifriction bearings (not shown) so that arm 18 is generally free to rotate about axis 20. Base 10 is also provided with a support and sensor assembly 22 which may be constructed integrally with base 10 or a fixed thereto by means of fasteners or welding, with assembly 22 being radiused as shown to match an arc defined by a free end 24 of arm 18. A lip 26 may be provided as shown on assembly 22, with a support wheel 28 mounted to arm 18 and adapted to ride along an upper surface of lip 26. Alternately, wheel 28 may be adapted to ride along an upper surface of assembly 22. Lip 26 and wheel 28 provide support for free end 24 of arm 18 while maintaining a slight clearance between arm 18 and assembly 22. A plurality of magnets 30 are positioned at evenly spaced intervals along a radiused upper surface 32 of assembly 22, with a drive coil 34 positioned in end 24 of arm 18 so that magnets 30 and drive coil 34 together form a linear motor. Alternately, a servo motor and rack and pinion arrangement or other drive means may be used to drive free end 24 of arm 18. A motor 36 of a type generally used in machining operations is mounted to arm 18 between end 24 and axis 20, and is conventionally provided with a tool holder 38 for holding a metalworking tool 40. Tool 40 may be a drill, surface cutting tool, friction stir welder or any other tool appropriate for the machining operation in progress.

For moving arm 18 over workpiece 14 and table 12, which movement may be for the purpose of positioning tool 40 prior to a drilling operation or for applying lateral force to tool 40 in a surface cutting or other operation, a gyroscope 42 is mounted to arm 18 so that a spin axis of gyroscopic mass 44 is positioned along and perpendicular to axis 20 about which arm 18 rotates. The spin axis of gyroscope 42, when parallel to a plane of movement of arm 18, is in its null position. When the spin axis is displaced by the solenoid to a point where lateral forces on arm 18 begin to decline, which point may be about 20 degrees in either direction from the null position, then this 20 degree point is considered the practical limits of displacement of the spin axis, or the null limits. Gyroscope 42 may be of the type commonly referred to as a command moment gyroscope (CMG), meaning that gyroscopic mass 44 either has a high rotational rate or a relatively large mass. In any case, gyroscope 42, when precessed, exerts lateral force to arm 18 via mounts 45, with the amount of lateral force applied to arm 18 being proportional to force applied to precess gyroscope 42. Gyroscopic mass 44 is mounted in a gimbal 46 so that a spin axis 48 of gyroscopic mass 44, in a null position, extends as shown through axis 20 perpendicular and parallel to arm 18. A lever arm 50 may be coupled to gimbal 46, with a plunger 52 of a linear solenoid, hydraulic actuator or the like 54 coupled to lever arm 50. As such, when plunger 52 is either extended or retracted, gimbal 46 is displaced, causing gyroscopic mass 44 to presess and exert lateral forces on arm 18, with amount of lateral force on arm 18 being proportional to amount of force applied to gimbal 46. As such, construction of gyroscope 42 is such that mounts 45, gimbal 46 and other components of gyroscope 42 are reinforced to withstand loads applied thereto during surface cutting and other similar operations. In some instances, these loads may be as high as several hundred pounds.

A first position sensor 56 is mounted to sense position of arm 18 about axis 20, and a second position sensor 58 is positioned to sense position of gimbal 46. In the event machine tool 8 is located on an unstable platform, such as a ship, yaw, pitch and roll may be sensed by yaw, pitch and roll sensor 60, which may be used to develop correction signals. Alternately, solenoid 54 may be a servo motor coupled to gimbal 46 by appropriately configured gearing in order to obtain mechanical advantage sufficient to exert forces to gimbal 46 as described. Further yet, plunger 52 of solenoid 54 and gimbal 46 may be provided with a rack and pinion arrangement, also configured to obtain sufficient mechanical advantage. Also, in some instances, it may be advantageous when moving arm 18 from one extreme position to the other to allow gyroscope 42 to become inverted from the position shown in FIG. 1 in order to maintain a null position of the spin axis 48. Here, position sensor 88 would sense when gyroscope 42 became inverted and appropriate adjustments made to a computer control system controlling swinging arm tool 18. In another alternate embodiment, supports 45 and solenoid 54 may be mounted to a table or other structure rotatable about axis 20 and selectively lockable to arm 18 and possibly lockable to stationary support 16. In this embodiment, the table would be locked to arm 18 when spin axis 48 is generally in a null position. When the spin axis is displaced to its null limit, the table would be unlocked from arm 18 and rotated in a direction to precess the gyroscope back to its null position. After the gyroscope is nulled, the table would again be locked and solenoid 54 activated to displace gimbal 46, again applying lateral forces to arm 18.

Figure 2:
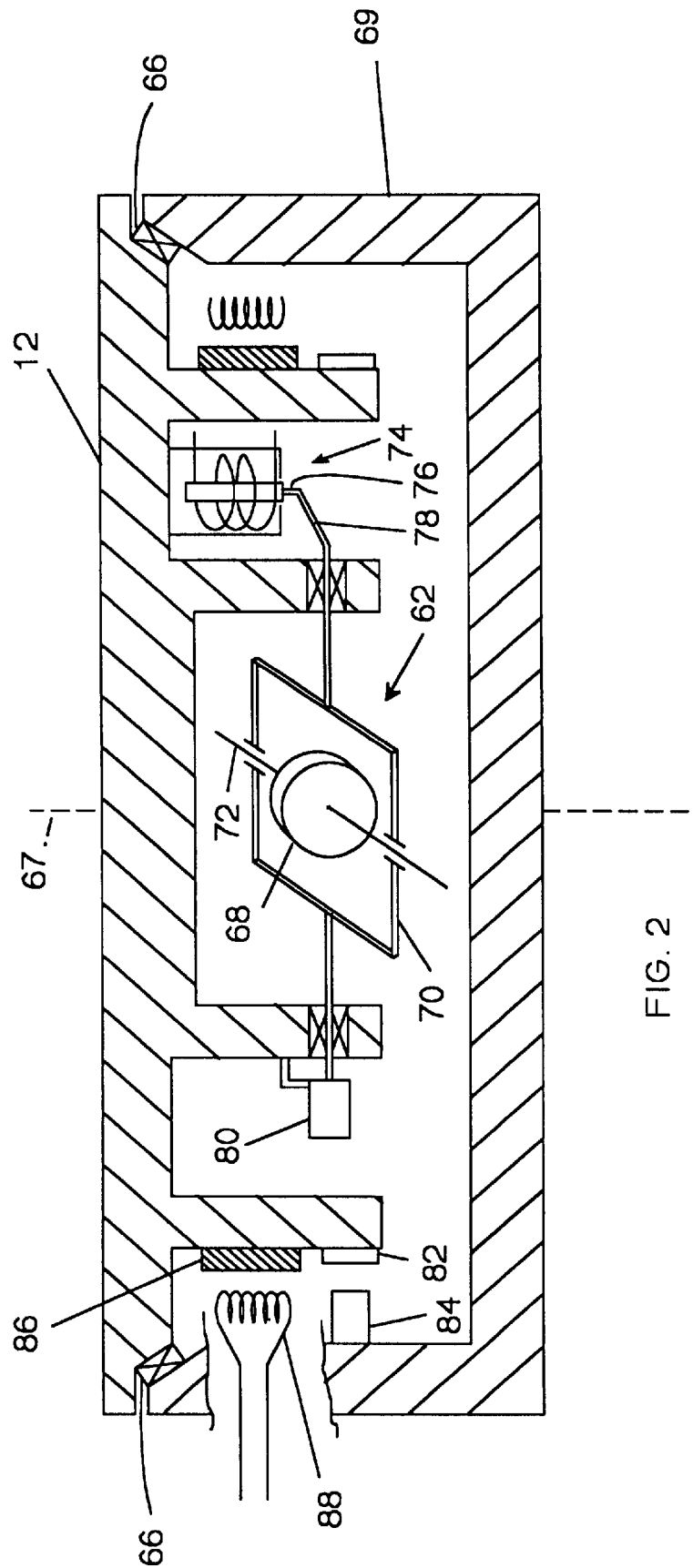
FIG. 2 is a diagrammatic view of a second embodiment of the instant invention.

Referring now to FIG. 2, a command moment gyroscope 62 is shown coupled to rotate rotary table 12. Here, table 12 is supported by antifriction and thrust bearings 66 on a base 69 and about an axis 67. Bearings 66 facilitate rotary movement of table 12. A gyroscopic mass 68 of gyroscope 62 is mounted in a gimbal 70 so that an axis 72 of gyroscopic mass 68, in a null position, is generally parallel with table 12. A solenoid, hydraulic cylinder or the like 74 as described above is fixed to a bottom of table 12 and provided with a plunger 76 coupled by a link 78 to gimbal 70. Solenoid 74, when energized, provides a downward or upward force to link 78, in turn vertically displacing axis 72 of gyroscopic mass 68. This causes gyroscope 62 to precess, rotating table 12 about axis 67. As described above, a gimbal position sensor 80 is mounted so as to sense position of gimbal 70. For sensing a position of table 12, a band portion 82 of a linear encoder, which may be of the reflective type, and available from the HEIDENHAIN CORPORATION, located at 115 Commerce Drive, Schaumberg, Ill., is circumstantially positioned about table 12 provides position information via encoder sensor 84. As described above, a plurality of regularly spaced magnets 86 are positioned about a periphery of table 12, with a drive coil 88 closely positioned to the magnets so as to rotate table 12 when coil 88 is appropriately energized. As such, drive coil 88 and magnets 86 together form a linear motor to rotate table 12 and in order to precess gyroscope 62 back to a null position. Alternately, sufficient current may be provided to drive coil 88 in order to lock table 12 in place while solenoid or other device 54 is activated to drive spin axis 72 back to a null position. It should be remembered that gyroscopic mass 43 of gyroscope 42 (FIG. 1) and gyroscopic mass 68 of gyroscope 62 (FIG. 2) are sized such that small excursions of gimbals 46 and 70, respectively, result in relatively large movement of arm 18 and table 12. However, the reverse is also true, i.e. small movements of arm 18 and table 12 result in relatively large displacements of gimbals 46 and 70, respectively. Where a great deal of surface cutting is to be undertaken requiring continuous forces to be applied to arm 18 and table 12 over an extended period, which would tend to displace the spin axes beyond their null limits, a CNC computer controlling the cutting operation may be programmed so that arm 18 (and if necessary table 12) are gyroscopically driven in one direction until the respective spin axes approach their null limits, whereupon the table and/or the arm are moved to a new, opposite cutting position so as to precess the respective gyroscopes to a null position. As such, the CNC program may be tailored so that such surface cutting may be accomplished in alternating steps inward from opposite sides of the workpiece or in alternating steps outward from the center of the workpiece, or timed to coincide with time intervals during which no machining is being undertaken. This keeps the spin axes generally centered about their respective null positions.

Figure 3:
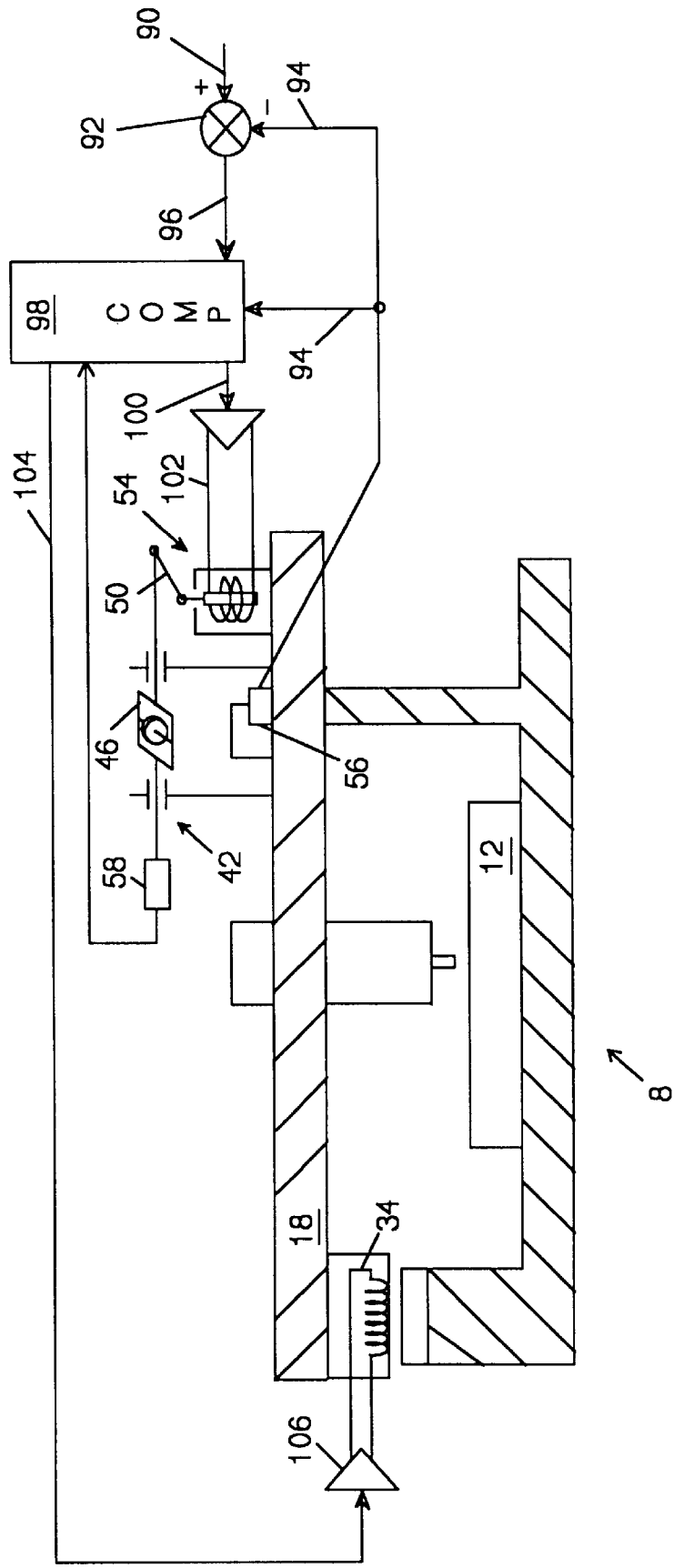
FIG. 3 is a block diagram of a control system for controlling a rotary arm machine tool.

One example of a control scheme for controlling the swinging arm tool of FIG. 1 is shown in FIG. 3. Here, a new position command 90 is summed at summing circuit 92 with a current position signal 94 from arm position sensor 56 to produce an error signal 96. Error signal 96, along with current position 94, is applied to a computer 98 in which is stored closed loop control laws for operating machine tool 8. These control laws operate in conjunction with the position signal 94 and error signal 96 to produce a command signal 100 that is amplified in amplifier 102 in order to develop sufficient power to drive solenoid 54. This precesses gyroscope 42 as described, moving arm 18 either to a new position or to apply force in a surface cutting operation. In this latter instance, lateral forces applied to workpiece 14 (FIG. 1) are equivalent to torque applied to gimbal 46 by solenoid 54. Here, as stated, mechanical advantage may be increased by lengthening lever 50, using a rack and pinion arrangement or a servo motor and appropriate gearing to apply force to gimbal 46.

During use, gimbal 46 may eventually become displaced from its null position. If this occurs, the signal from gimbal position sensor 58 may be used in computer 98 to develop an energizing signal 104 that is amplified in amplifier 106 and applied to drive coil 34, locking arm 18 in place while gimbal 46 is driven back to a null position by solenoid 54. Alternately, gimbal 46 may be driven to a null position during times when a machining operation is not in progress, such as during intervals when machine tools are being changed or arm 18 is being driven to a new position.

Figure 4:
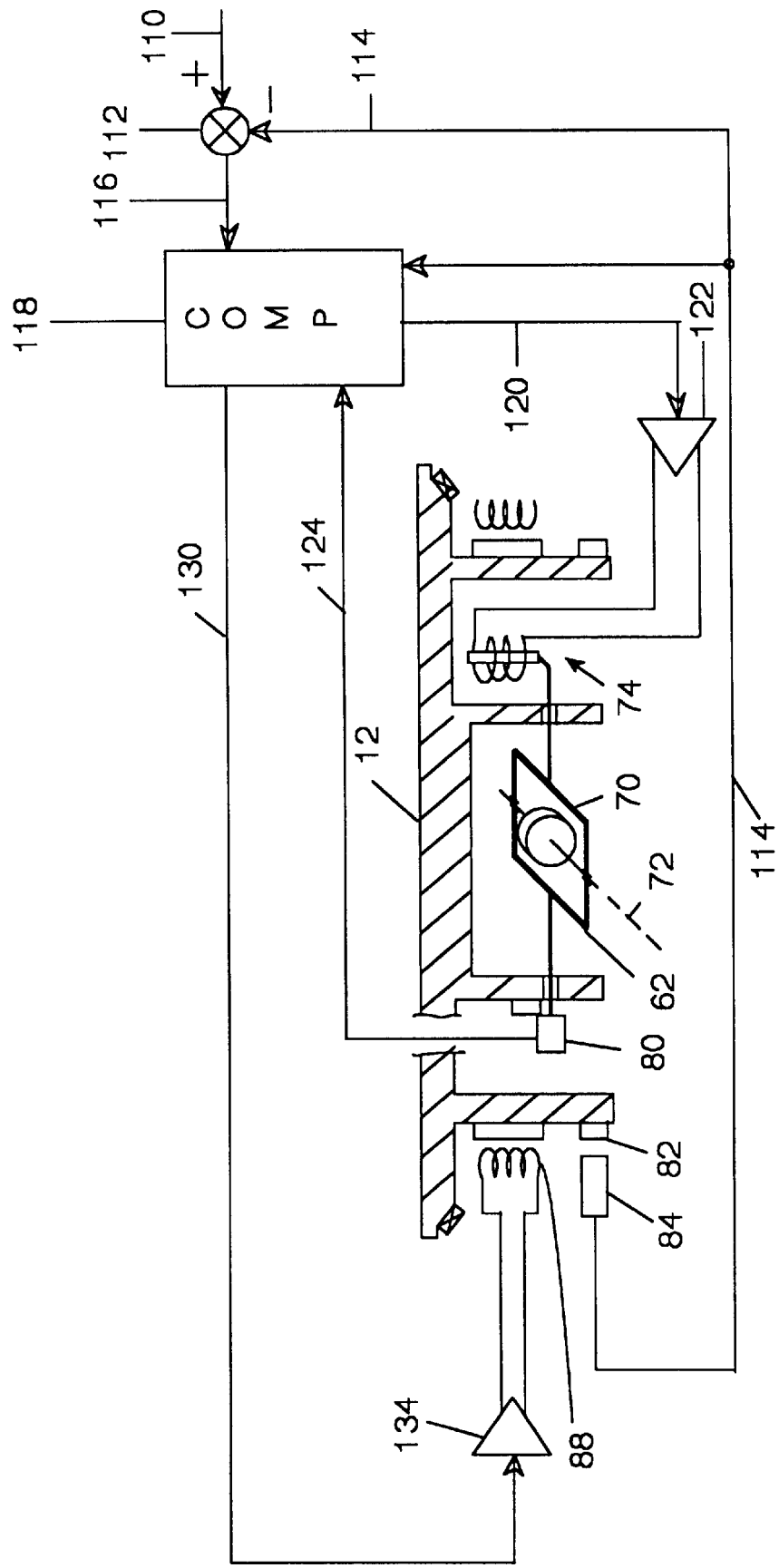
FIG. 4 is a block diagram of a control system for controlling a rotary table.

Referring now to FIGS. 2 and 4, a control scheme for controlling motion of rotary table 12 (FIG. 2) is shown. Here, a new position command is provided at 110 to a summing circuit 112 along with current table position 114 from band 82 and sensor 84. From these signals, an error signal 116 is developed and provided to computer 118, which in turn provides a drive signal 120 to amplifier 122. Amplifier 122 amplifies the drive signal and provides it to solenoid 74, which in turn applies force to gimbal 70, precessing gyroscope 62. During a machining or other operation, when axis 72 of gyroscope 62 becomes displaced to its null limits, gyroscope position sensor 80 provides a position signal 124 to computer 118. This position signal 124 is used by computer 118 to develop a spin axis error signal 130. This spin axis error signal is provided to amplifier 134, which in turn provides an amplified drive signal to drive coil 88, driving rotary table 12 to precess spin axis 48 back to a null position.

Figure 5:
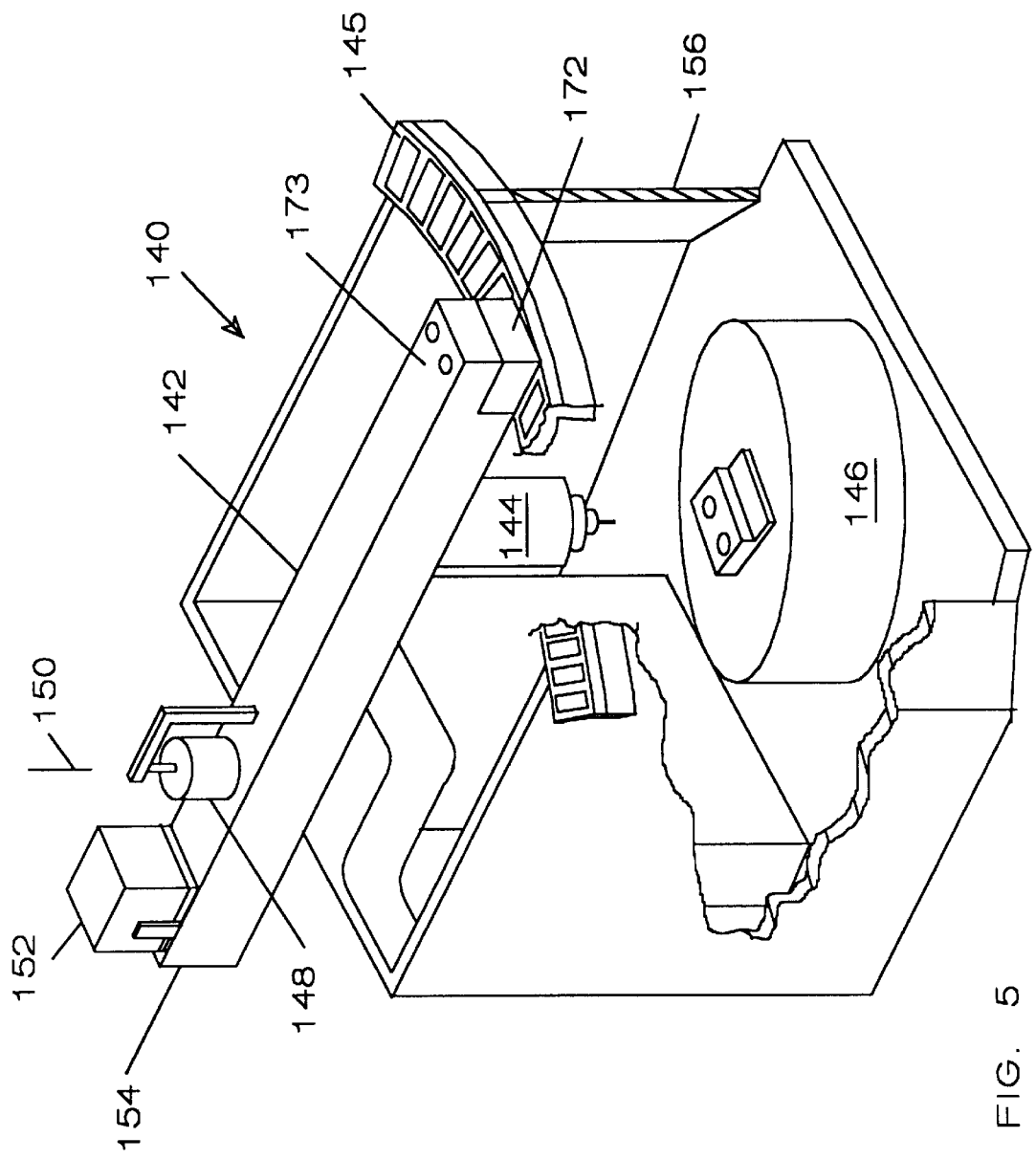
FIG. 5 is a diagrammatic view of a third embodiment of a rotary arm machine tool.
Figure 6:
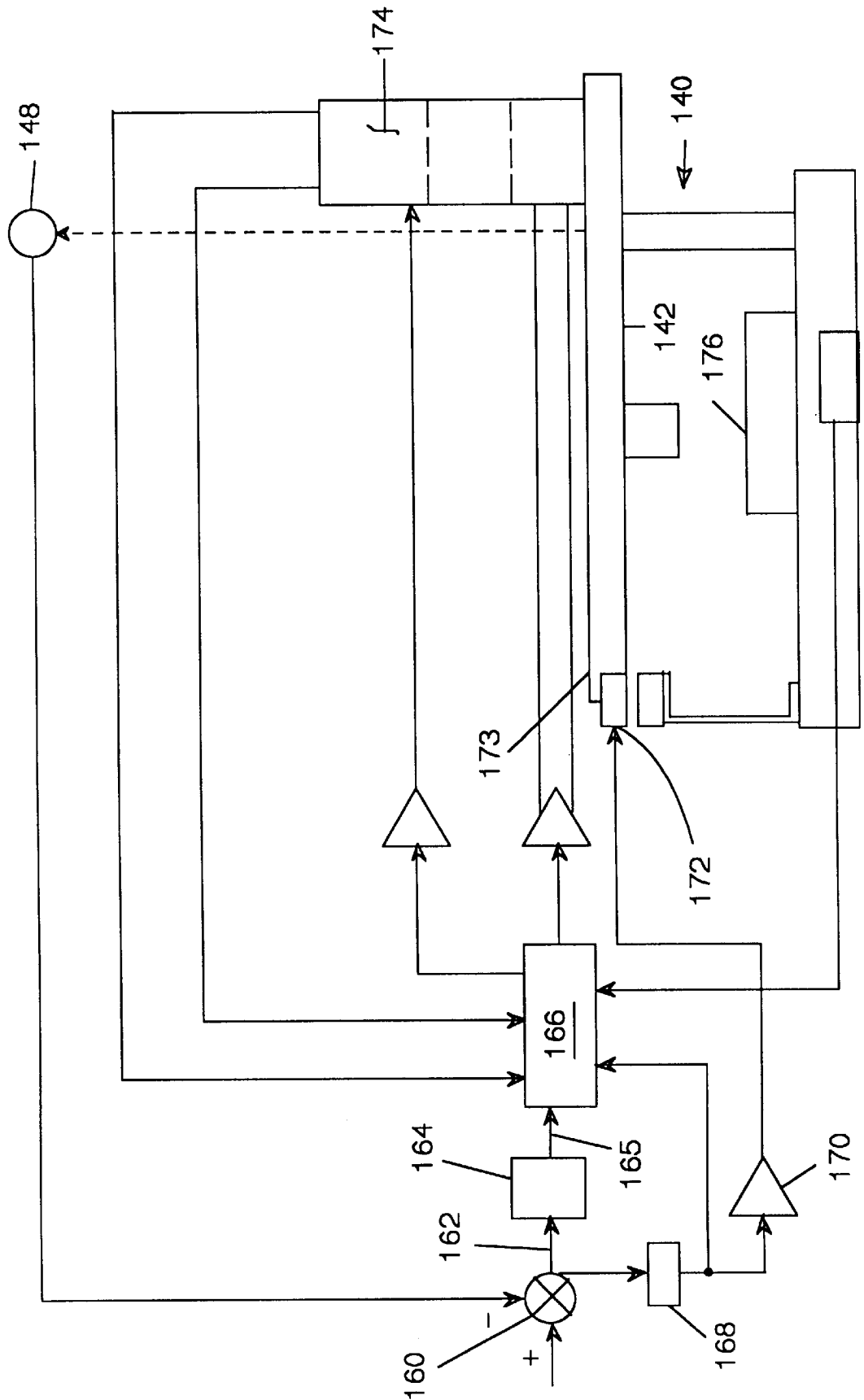
FIG. 6 is a block diagram of a control system for the embodiment shown in FIG. 5.

Referring now to FIGS. 5 and 6, yet another embodiment of the invention is shown. Here, a swinging arm machine tool 140 generally as described above is provided with a swinging arm 142, machining motor 144, support and linear drive motor assembly 145 and a rotary table 146. An arm position sensor 148 is mounted over an axis of rotation 150 of swinging arm 142, and is coupled to a pivot of arm 142 so as to sense position of arm 142. A command moment gyroscope 152 as described above, or configured as described in U.S. Pat. No. 5,655,412, which as stated is incorporated in its entirety herein by reference, is mounted near an end 154 of arm 142. In this embodiment, gyroscope or gyroscopes 152 serves to assist in counterbalancing motor 144 in addition to powering arm 142. Rotary table 146 may be provided with a second pair of command moment gyroscopes as described in the referenced patent or a single gyroscope as described above, and which serves to rotate table 146. A lower portion of machine 140 may be housed or enclosed by a cabinet 156, which also may be provided with supports for supporting an upper end of assembly 145.

FIG. 6 shows a control scheme for operating machine tool 140, this control scheme also being generally as described above. Here, at summing circuit 160, a position signal from arm position sensor 148 and a command signal provided by a user, which which may be provided from a conventional CNC console, are summed to develop a position error signal 162. This error signal, as with the error signals described above, is generally comprised of two components, a lower frequency constant velocity component and higher frequency acceleration/deceleration components. This error signal is applied to high pass filter 164, which blocks the lower frequency constant velocity component and passes the higher frequency acceleration/deceleration components. As such, the signal 165 from high pass filter 164 is comprised of acceleration and deceleration commands. These signals are processed by computer 166 in accordance with the closed loop control scheme as described above so that arm 142 accelerates and decelerates responsive to acceleration and deceleration components in the signal from high pass filter 164. Concurrently with the error signal being applied to high pass filter 164, the error signal is applied to low pass filter 168. Filter 168 passes the low frequency constant velocity error signal to power amplifier 170, which provides the amplified constant velocity signal to coil assembly 172 in end 173 of arm 142. This drives arm 142 at a constant velocity in a direction to null the error voltage from low pass filter 168. The error signal from low pass filter 168 may also be applied to computer 166 so that computer 166 develops instructions to drive a servo 174 as described in the incorporated patent so that the axis of the gyroscope is driven to a null position. Gain and responses of high pass filter 164 and low pass filter 168 may be selected to provide dampened, closed loop response to position and velocity commands. Alternately, as described in the foregoing, computer 166 may utilize the signals from summing circuit 160 to develop a drive signal applied to coils 172 for driving arm 142, precessing the gyroscope or gyroscopes to a null position.

In a like manner, rotary table 176 may be fitted with a gyroscope, position sensor and linear motor (not shown), or where a system is constructed as described in the referenced patent, a servo motor for holding the table stationary while the gyroscope is precessed to a null position.

In operation, and referring to FIGS. 1 and 2, a user provides a command to rotate arm 18 or table 12, which command typically originating in a CNC console, as should be apparent to one skilled in the art. The signal is applied to summing circuitry and the appropriate computer as described in order to develop a signal for precessing a gyroscope of either arm 18 or table 12. For a drilling operation arm 18 and table 12 are driven to the appropriate position and then held stationary, while for a surface cutting operation arm 18 and table 12 are initially driven to an origin where the surface cut is to begin. As the cut proceeds, arm 18 and table 12 are moved by their respective gyroscopes being precessed by command signals. In the event the spin axes become displaced to their null limits and correction may not be done by moving the arm or table to an opposite side of the workpiece, an energizing signal may be sent to coil 34 locking arm 18 (or table 12) in place while the solenoids (or other drive devices) 54 are activated to drive the out-of-null spin axes back to null positions. However, since gyroscopic masses of gyroscope 42 and 62 will be relatively large with respect to arm 18 and table 12, it is anticipated that only rarely would the necessity arise to precess gyroscope 42 back to a null position during a machining operation. Further, as arm 18 and table 64 are moved to different positions during machining operations, it is anticipated that the gyroscopes will generally be maintained about the null position.

After having described my invention and the matter of its use, it should be apparent that incidental changes may be made thereto that fairly fall within the scope of the following appended claims, wherein I claim:

I claim:

1. A machine tool comprising:
    a base,
    a rotatable member having a longitudinal axis and supported about a pivot on said base for rotation in one plane of movement,
    a gyroscopic mass rotatably supported by a gimbal, the gimbal having a gimbal rotation axis and the gyroscopic mass having a spin axis, said spin axis oriented about 90 degrees to the gimbal rotation axis, said gimbal rotatably supported on said rotatable member so that said gimbal rotation axis is generally parallel with a plane of rotation of said rotatable member, and said spin axis of said gyroscopic mass, in a null position, is generally parallel with said longitudinal axis of said rotatable member.
    means responsive to position of said rotatable member and a control signal, for developing a drive signal,
    an actuator responsive to said drive signal and coupled to said gimbal in order to rotate said gimbal about said gimbal rotation axis,
    whereby as said gimbal is rotated, precession of said gyroscopic mass moves said rotatable member in accordance with said control signal.

2. A machine tool as set forth in claim 1 further comprising material working apparatus coupled to said rotatable member, for modifying material of a workpiece.

3. A machine tool as set forth in claim 2 wherein said material working apparatus comprises a motor having machine tool holding apparatus for holding a machine tool in operable relation with said workpiece.

4. A machine tool as set forth in claim 2 wherein said material working apparatus further comprises welding apparatus.

5. A machine tool as set forth in claim 1 wherein said rotatable member is a swinging arm.

6. A machine tool as set forth in claim 5 wherein said gyroscopic mass is positioned generally near a first end of said swinging arm.

7. A machine tool as set forth in claim 6 wherein said pivot is positioned near said first end, with said gyroscopic mass positioned generally over said pivot.

8. A machine tool as set forth in claim 6 further comprising a support for supporting a second end of said swinging arm as said swinging arm traverses said workpiece.

9. A machine tool as set forth in claim 8 further comprising means for moving said second end of said swinging arm in order to precess said gyroscopic mass back to said null position.

10. A machine tool as set forth in claim 9 wherein said means for moving said second end of said swinging arm includes a motor for applying force to said second end.

11. A machine tool as set forth in claim 8 wherein said second end of said swinging arm and said support further comprises means for holding said second end in place while said actuator precesses said gyroscopic mass back to said null position.

12. A machine tool as set forth in claim 1 wherein said rotatable member is a rotary table for holding said workpiece thereon.

13. A machine tool as set forth in claim 12 further comprising means for moving said rotary table in order to precess said gyroscopic mass back to said null position.

14. A machine tool as set forth in claim 13 wherein said means for moving said rotary table comprises a motor.

15. A machine tool as set forth in claim 12 further comprising means for holding said rotary table stationary while said actuator precesses said gyroscopic mass back to said null position.

16. A machine tool comprising:
    a base,
    a rotatable member supported for rotation in one plane of movement by a pivot mounted to said base,
    a gyroscopic mass having a spin axis and rotatably supported by a gimbal, said gimbal having a gimbal rotation axis, with said spin axis oriented about 90 degrees to the gimbal rotation axis, said gimbal rotatably supported on said member so that said gyroscopic mass is supported over said pivot, said gimbal rotation axis and said spin axis being generally parallel with a plane of rotation of said member,
    an actuator coupled to said gimbal for applying a rotational force thereto,
    electrical means responsive to position of said member and a control signal, for energizing said actuator to apply rotational force to said gimbal, whereby as said gimbal is rotated, precession of said gyroscopic mass moves said member in accordance with said control signal.

17. A machine tool as set forth in claim 16 further comprising means for moving said member in order to precess said gyroscopic mass back to a null position.

18. A machine tool as set forth in claim 16 further comprising means for locking said member to said base, and energizing said actuator to precess said gyroscopic mass back to a null position.

* * * * *